United States Patent
Choi et al.

(10) Patent No.: US 11,733,900 B2
(45) Date of Patent: Aug. 22, 2023

(54) PROMPT AND GRADUAL MIGRATION SCHEMES

(71) Applicant: Samsung Electronics Co., Ltd., Suwon-si (KR)

(72) Inventors: Changho Choi, San Jose, CA (US); Yang Seok Ki, Palo Alto, CA (US); Sungwook Ryu, Palo Alto, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 55 days.

(21) Appl. No.: 17/037,178

(22) Filed: Sep. 29, 2020

(65) Prior Publication Data

US 2021/0389897 A1    Dec. 16, 2021

Related U.S. Application Data

(60) Provisional application No. 63/039,456, filed on Jun. 15, 2020.

(51) Int. Cl.
  *G06F 3/00* (2006.01)
  *G06F 3/06* (2006.01)
  *G06F 11/10* (2006.01)

(52) U.S. Cl.
  CPC .......... *G06F 3/0647* (2013.01); *G06F 3/0617* (2013.01); *G06F 3/0634* (2013.01); *G06F 3/0689* (2013.01); *G06F 11/1084* (2013.01); *G06F 11/1092* (2013.01)

(58) Field of Classification Search
  CPC .... G06F 3/0647; G06F 3/0617; G06F 3/0634; G06F 3/0689; G06F 11/1084; G06F 11/1092
  See application file for complete search history.

(56) References Cited

U.S. PATENT DOCUMENTS

| | | | |
|---|---|---|---|
| 9,710,317 B2 | 7/2017 | Gupta et al. | |
| 10,089,027 B2 | 10/2018 | Hashimoto et al. | |
| 10,459,652 B2 | 10/2019 | Davis et al. | |
| 2004/0260967 A1* | 12/2004 | Guha | G06F 11/008 714/E11.02 |
| 2018/0210798 A1* | 7/2018 | Xu | G06F 11/1092 |
| 2018/0349234 A1* | 12/2018 | Liu | G06F 11/2087 |
| 2020/0020398 A1 | 1/2020 | Miller et al. | |

FOREIGN PATENT DOCUMENTS

EP    1770499 A1    4/2007

OTHER PUBLICATIONS

McEwan, Alistair, et al., "Reliability and performance enhancements for SSD RAID," Microprocessors and Microsystems, Nov. 2016, 23 pages.

SNIA, Advancing storage & information technology, "Common RAID Disk Data Format Specification", Common RAID Disk Data Format (DDF), SNIA Technical Position, Version 2.0 , Rev. 19, pp. 1-126, Mar. 27, 2009, https://www.snia.org/sites/default/files/SNIA_DDF_Technical_Position_v2.0.pdf.

* cited by examiner

*Primary Examiner* — Reginald G Bragdon
*Assistant Examiner* — Michael L Westbrook
(74) *Attorney, Agent, or Firm* — Lewis Roca Rothgerber Christie LLP (57) ABSTRACT

Provided are mechanisms for promptly or gradually migrating data from a read-only disk in a storage system to a replacement disk, where, during gradual migration, data is migrated when it is requested of the read-only disk.

19 Claims, 9 Drawing Sheets

PROMPT AND GRADUAL MIGRATION SCHEMES

CROSS-REFERENCE TO RELATED APPLICATION

This application claims the priority benefit under 35 U.S.C. § 119(e) to U.S. Provisional Application No. 63/039,456, filed on Jun. 15, 2020, the disclosure of which is incorporated herein by reference in its entirety.

TECHNOLOGICAL FIELD

Aspects of the present disclosure relate to methods and non-transitory computer media containing instructions for operating migrating data in storage systems comprising drives capable of entering read-only mode.

BACKGROUND

The following background is intended solely to provide information necessary to understand the context of the inventive ideas and concepts disclosed herein. Thus, this background section may contain patentable subject matter and should not be regarded as a disclosure of prior art.

Some storage devices may contain storage media (e.g., flash memory) that are only capable of a limited number of erase cycles before failing. When such storage media is close to its end of life, the storage device may be switched over to a read-only mode. This prevents further damage to the underlying storage media, and enables the data held thereon to still be accessed safely.

However, this presents a problem, particularly in storage systems where the (now) read-only drive is part of a multi-disk storage system that expects or ordinarily operates with component drives (such as the read-only drive) capable of accepting writes. Thus, there is a need to provide for controlled migration of data out of read-only drives, and into write-capable drives, and for ultimately replacing the read-only drive with the write-capable drive in the storage system.

SUMMARY

Aspects of embodiments of the concepts of the present disclosure relate to a method for migrating data in a storage system comprising a plurality of active extents and one or more replacement logical or physical drives. The method may comprise: determining that an active extent of a storage system has entered read-only mode, and determining, based on a storage policy, whether the storage system should promptly migrate data or gradually migrate data; then, based on determining that the storage system should promptly migrate data, copying data from the read-only extent to a replacement logical or physical drive as soon as possible; or, alternatively, based on determining that the storage system should gradually migrate data, upon receiving a read request for a data unit in the extent, copying the data unit from the read-only drive to the replacement logical or physical drive, and, upon receiving a write request for a data unit in the read-only extent, writing the data unit to the replacement logical or physical drive.

Further aspects of embodiments of the concepts of the present disclosure relate to a non-transitory computer-readable medium, having thereon instructions that cause a processor in a computer storage system comprising a plurality of active extents and one or more replacement logical or physical drives to perform a process. The process may be as follows: determining that an active extent of a storage system has entered read-only mode, and determining, based on a storage policy, whether the storage system should promptly migrate data or gradually migrate data; then, based on determining that the storage system should promptly migrate data, copying data from the read-only extent to a replacement logical or physical drive as soon as possible; or alternatively, based on determining that the storage system should gradually migrate data, upon receiving a read request for a data unit in the extent, copying the data unit from the read-only drive to the replacement logical or physical drive, and, upon receiving a write request for a data unit in the read-only extent, writing the data unit to the replacement logical or physical drive.

BRIEF DESCRIPTION OF THE DRAWINGS

These and other features and aspects of the present disclosure will be appreciated and understood with reference to the specification, claims, and appended drawings wherein:

DETAILED DESCRIPTION

Various example embodiments will be described more fully hereinafter with reference to the accompanying drawings, in which some example embodiments are shown. The presently disclosed subject matter may, however, be embodied in many different forms and should not be construed as being limited to the example embodiments set forth herein. Rather, these example embodiments are provided so that this disclosure will be thorough and complete, and will fully convey the scope of the presently disclosed subject matter to those skilled in the art. In the drawings, the sizes and relative sizes of layers and regions may be exaggerated for clarity.

It will be understood that when an element or layer is referred to as being "on", "connected to", or "coupled to" another element or layer, it may be directly on, connected to, or coupled to the other element or layer, or intervening elements or layers may be present. When an element or layer is referred to as being "directly on", "directly connected to", or "directly coupled to" another element or layer, there are no intervening elements or layers present. Like numerals refer to like elements throughout. As used herein, the term "and/or" comprises any and all combinations of one or more of the associated listed items.

It will be understood that, although the terms first, second, third, and so on may be used herein to describe various elements, components, regions, layers, and/or sections, these elements, components, regions, layers, and/or sections should not be limited by these terms. These terms are used only to distinguish one element, component, region, layer, or section from another element, component, region, layer, or section. Thus, a first element, component, region, layer, or section discussed below could be termed a second element, component, region, layer, or section without departing from the teachings of the presently disclosed subject matter.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and an orientation of below. The device may be otherwise oriented (rotated 90 degrees or at other orientations), and the spatially relative descriptors used herein should be interpreted accordingly.

The terminology used herein is for the purpose of describing particular example embodiments only and is not intended to be limiting of the presently disclosed subject matter. As used herein, the singular forms "a", "an", and "the" are intended to comprise the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances are to be expected. Thus, example embodiments should not be construed as being limited to the particular shapes of regions illustrated herein but are to comprise deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature, and their shapes are not intended to illustrate the actual shape of a region of a device and are not intended to limit the scope of the presently disclosed subject matter.

Unless otherwise defined, all terms (including technical and scientific terms) used herein have the same meanings as would be commonly understood by one of ordinary skill in the art to which this disclosed subject matter belongs. It will be further understood that terms, such as those defined in commonly used dictionaries, should be interpreted as having meanings that are consistent with their respective meanings in the context of the relevant art and will not be interpreted in an idealized or overly formal sense unless expressly so defined herein.

Hereinafter, example embodiments will be explained in detail with reference to the accompanying drawings.

Figure 1:
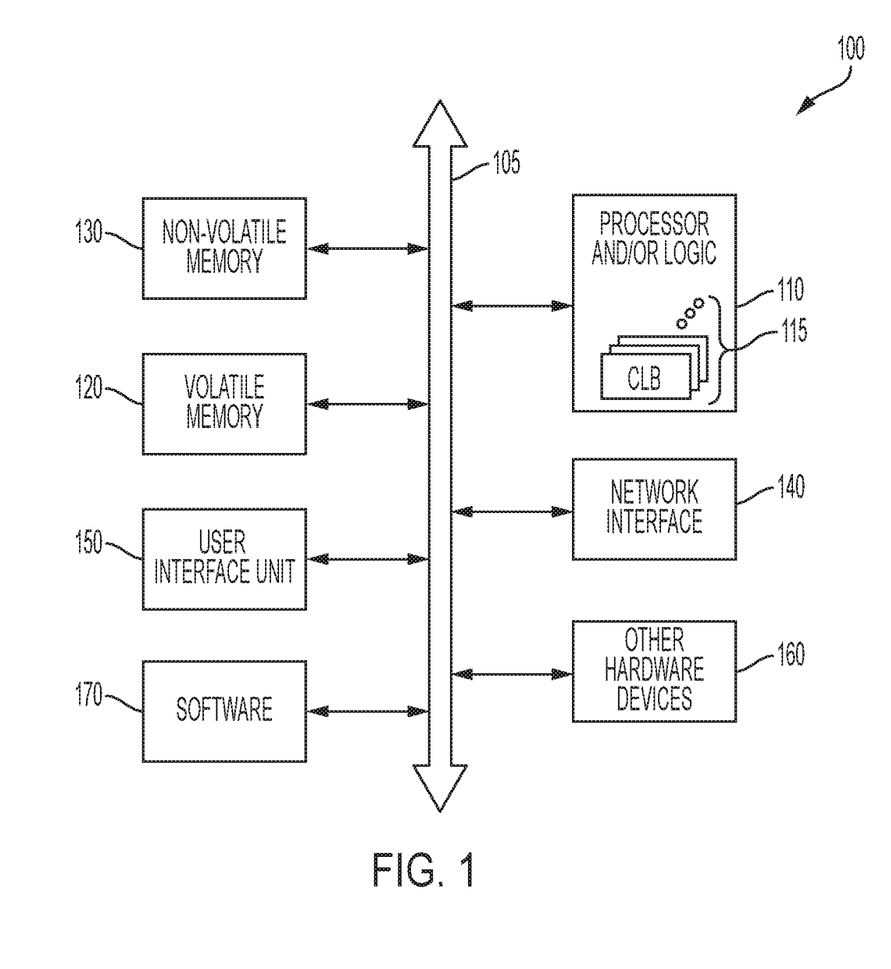
FIG. 1 is a schematic block diagram of an information processing system that may comprise devices formed according to some example embodiments of the present disclosure.

FIG. 1 is a schematic block diagram of an information processing system 100, which may comprise semiconductor devices formed according to the principles of the disclosed subject matter.

Referring to FIG. 1, an information processing system 100 may comprise one or more of devices constructed according to the principles of the disclosed subject matter. In one or more other embodiments, the information processing system 100 may employ or execute one or more techniques according to the principles of the disclosed subject matter.

In various embodiments, the information processing system 100 may comprise a computing device, such as, for example, a laptop, desktop, workstation, server, blade server, personal digital assistant, smartphone, tablet, and other appropriate computers or a virtual machine or virtual computing device thereof. In various embodiments, the information processing system 100 may be used by a user.

The information processing system 100 according to the disclosed subject matter may further comprise a central processing unit (CPU), logic, or processor 110. In some embodiments, the processor 110 may comprise one or more functional unit blocks (FUBs) or combinational logic blocks (CLBs) 115. In such an embodiment, a combinational logic block may comprise various Boolean logic operations (e.g., NAND, NOR, NOT, XOR), stabilizing logic devices (e.g., flip-flops, latches), other logic devices, or a combination thereof. These combinational logic operations may be configured in simple or complex fashion to process input signals to achieve a desired result. It is to be understood that while a few illustrative examples of synchronous combinational logic operations are described herein, the disclosed subject matter is not limited thereto and may comprise asynchronous operations, or a mixture of synchronous and asynchronous operations. In one embodiment, the combinational logic operations may comprise a plurality of complementary metal-oxide-semiconductor (CMOS) transistors. In various embodiments, these CMOS transistors may be arranged into gates that perform logical operations, although it is to be understood that other technologies may be used and are within the scope of the disclosed subject matter.

The information processing system 100 according to the disclosed subject matter may further comprise a volatile memory 120 (e.g., a Random Access Memory (RAM)). The information processing system 100 according to the disclosed subject matter may further comprise a non-volatile memory 130 (e.g., a hard drive, an optical memory, a NAND or flash memory, and/or other solid-state memories). In some embodiments, either the volatile memory 120, the non-volatile memory 130, or a combination or portions thereof may be referred to as a "storage medium". In various embodiments, the volatile memory 120 and/or the non-volatile memory 130 may be configured to store data in a semi-permanent or substantially permanent form.

In various embodiments, the information processing system 100 may comprise one or more network interfaces 140 configured to allow the information processing system 100 to be part of and communicate via a communications network via a wired and/or wireless and/or cellular protocol. Examples of a wireless protocol may comprise, but are not limited to, Institute of Electrical and Electronics Engineers (IEEE) 802.11g, IEEE 802.11n. Examples of a cellular protocol may comprise, but are not limited to: IEEE 802.16m (a.k.a. Wireless-MAN (Metropolitan Area Network) Advanced), Long Term Evolution (LTE) Advanced, Enhanced Data rates for GSM (Global System for Mobile Communications) Evolution (EDGE), Evolved High-Speed Packet Access (HSPA+). Examples of a wired protocol may comprise, but are not limited to, IEEE 802.3 (a.k.a. Ethernet), Fibre Channel, Power Line communication (e.g., HomePlug, IEEE 1901). It is to be understood that the above are merely a few illustrative examples to which the disclosed subject matter is not limited. As a result of being connected to a network via the network interfaces 140, the information processing system 100 may have access to other resources, for example, external volatile memories, non-volatile memories, processors/logic, and software, whether as stand-alone network resources or as components of an external additional system.

The information processing system 100 according to the disclosed subject matter may further comprise a user interface unit 150 (e.g., a display adapter, a haptic interface, and/or a human interface device). In various embodiments, this user interface unit 150 may be configured to either receive input from a user and/or provide output to a user. Other kinds of devices may be used to provide for interaction with a user as well; for example, feedback provided to the user may be any form of sensory feedback, e.g., visual feedback, auditory feedback, and/or tactile feedback; and input from the user may be received in any form, including acoustic, speech, and/or tactile input.

In various embodiments, the information processing system 100 may comprise one or more other devices or hardware components 160 (e.g., a display or monitor, a keyboard, a mouse, a camera, a fingerprint reader, and/or a video processor). It is to be understood that the above are merely a few illustrative examples to which the disclosed subject matter is not limited.

The information processing system 100 according to the disclosed subject matter may further comprise one or more system buses 105. In such an embodiment, the system bus 105 may be configured to communicatively couple the processor 110, the volatile memory 120, the non-volatile memory 130, the network interface 140, the user interface unit 150, and one or more hardware components 160. Data processed by the processor 110 or data inputted from outside of the non-volatile memory 130 may be stored in either the non-volatile memory 130 or the volatile memory 120.

In various embodiments, the information processing system 100 may comprise or execute one or more software components 170. In some embodiments, the software components 170 may comprise an operating system (OS) and/or an application. In some embodiments, the OS may be configured to provide one or more services to an application and manage or act as an intermediary between the application and the various hardware components (e.g., the processor 110 and/or a network interface 140) of the information processing system 100. In such an embodiment, the information processing system 100 may comprise one or more native applications, which may be installed locally (e.g., within the non-volatile memory 130) and configured to be executed directly by the processor 110 and directly interact with the OS. In such an embodiment, the native applications may comprise pre-compiled machine executable code. In some embodiments, the native applications may comprise a script interpreter (e.g., C shell (csh), AppleScript, AutoHotkey) and/or a virtual execution machine (VM) (e.g., the Java Virtual Machine, the Microsoft Common Language Runtime) that are configured to translate source or object code into executable code which is then executed by the processor 110.

As discussed herein, devices may comprise logics configured to perform various tasks. The logics may be embodied as hardware, software, or a combination thereof. When a logic comprises hardware, the hardware may be in the form of specialized circuit arrangements (e.g., ASICS), programmable arrays of gate logics and memories (e.g., FPGAs), or specially programmed general purpose logic (e.g., CPUs and GPUs). When the logic comprises software, the software may be configured to operate specialized circuits, or to program arrays of circuits, memories, or operate general purpose processors. Logic embodied in software may be stored on any available storage medium, such as DRAM, flash, EEPROM, Resistive memories, and/or the like.

Figure 2A:
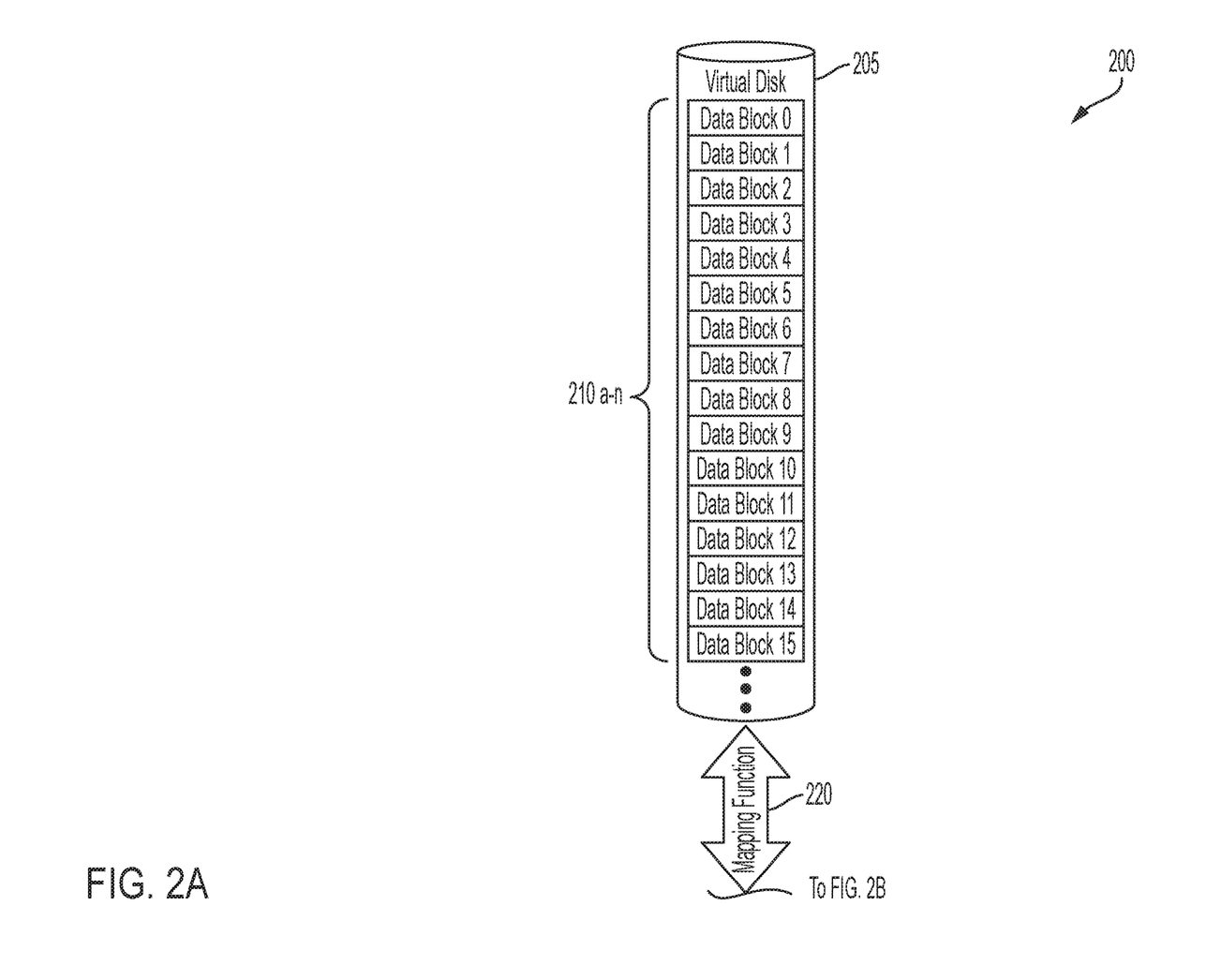
FIGS. 2A and 2B illustrate a schematic diagram of a storage system according to some example embodiments of the present disclosure.
Figure 2B:
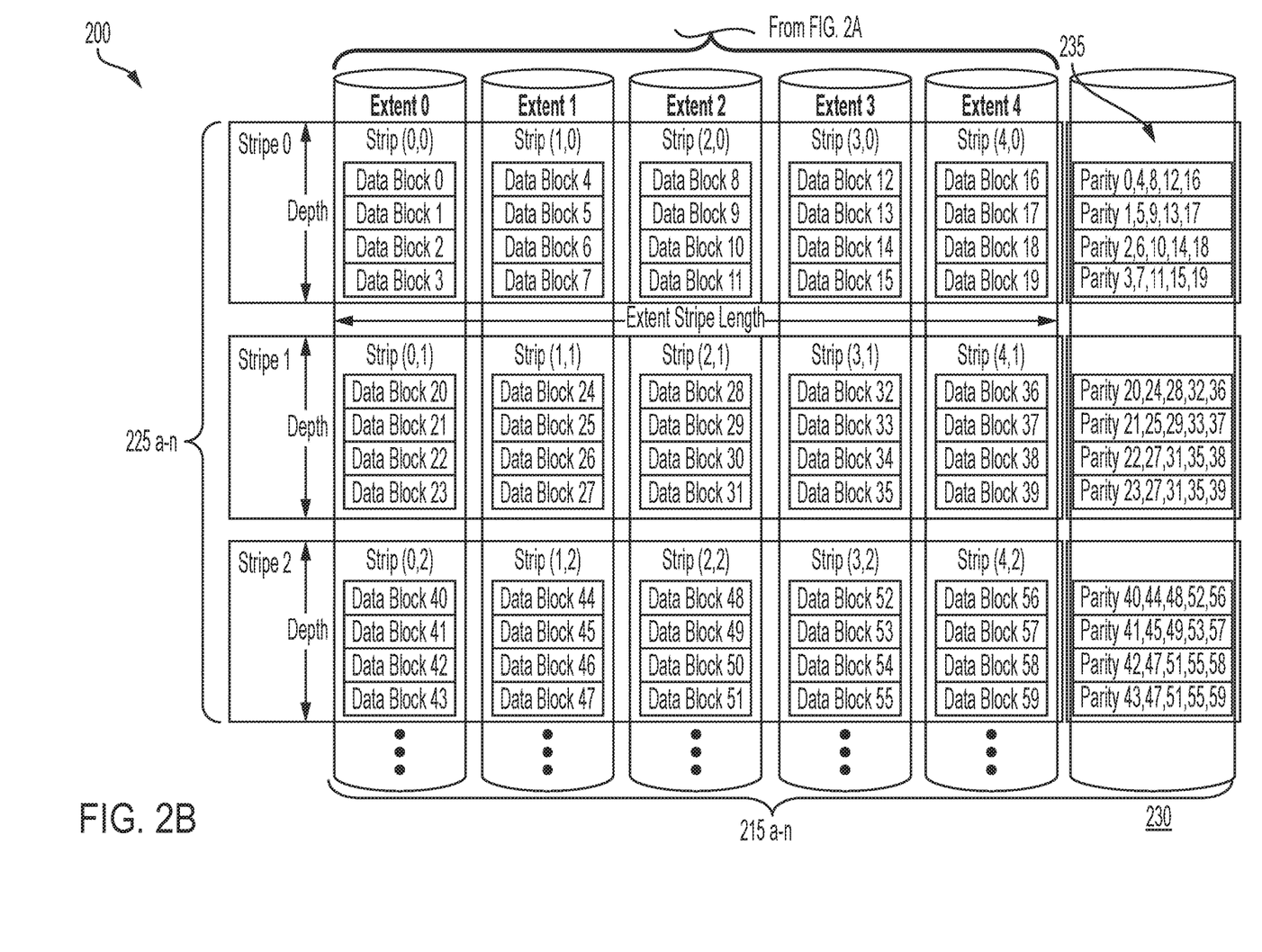

Turning to FIGS. 2A and 2B, an example storage system 200 according to some embodiments is shown. The storage system may serve as the non-volatile memory 130 of FIG. 1, and/or it may be accessible to the system 100 over the network interface 140. The storage system may present a virtual disk 205 as a logical construct to a host system (not shown), such as the system 100 of FIG. 1. The virtual disk may store data units. Such data units may be, for example, data blocks, shown as data blocks 210 a-n in the illustrated embodiment. In some other embodiments, data units may represent other fundamental storage structures, such as Key-Value values, object store objects, or blobs, amongst others.

In the illustrated embodiment, the logical construct of the virtual disk 205 is provided from a set of two or more physical drives, each physical drive comprising an extent of the storage system, such as 215 a-n. In some instances, a single physical drive may house one extent, or many extents, however, in the examples that follow, drives and extents are used with a 1-to-1 mapping. Thus, as used herein, "extent" and "physical drive" are treated as similar terms, but, in some alternate embodiments, drives may comprise a plurality of extents. However, one skilled in the art would readily understand how the concepts discussed herein may be applied to cases where a single physical drive houses multiple extents. The number of storage drives/extents 215 a-n is in any given embodiment is a matter of design choice, according to the principles discussed below.

The data presented by the virtual disk 205 is stored on, and retrieved from, one or more of the extents 215 a-n according to a mapping function 220. The nature of the mapping function, and the number and nature of the extents 215 a-n, depend on the nature of the storage system 200. For example, in embodiments where the storage system 200 is configured as a RAID 0 system, all data units are divided by the mapping function into stripes 225 a-n. Each stripe 225 a-n has a length, defining the number of extents 215 a-n which the data is saved across. The portion of a stripe located on an extent may be referred to as a "strip". Each stripe (and strip) also has a depth, determining the number of data units (or size of data) stored in each extent 215 a-n in a pre-determined (or pre-calculatable) order. Each extent 215 a-n may receive its depth's-worth of data units in the particular stripe 225 a-n. Thus, assuming that the data unit is a fixed size block with a known block number/logical address, and that both the stripe length and depth are known, then its location in the set of extents 215 a-n can easily be mathematically calculated and/or stored in a mapping table. A strip may be identified, for example, by an ordered pair of (stripe #, extent #). A block may be identified by an ordered triplet (stripe #, extent #, depth-in-stripe).

In another example embodiment, the system may be configured as a RAID 1 system. The mapping function 220 would be similar in many respects to that of a RAID 0 system above, except that half of the extents 215 *a-n* are used as direct read/write storage locations, and the other half are reserved for mirroring the contents of the first half in order to provide data redundancy.

In another example embodiment, the system may be configured as a RAID system utilizing parity, such as RAID 4, 5, or 6 (amongst others). Such a system may utilize one or more dedicated parity extents 230 (e.g., RAID 4), or parity information may be distributed amongst the extents 215*a-n* algorithmically (e.g., RAID 5, 6). In a parity based system, M≥2 extents 215 *a-n* are used to store data, and N≥1 extents 215 *a-n* are used to store parity calculation information. If any number of extents 215 *a-n*≤N are lost, the data can be reconstructed from a combination of the remaining data/parity data on the surviving extents 215 *a-n*.

In an embodiment using a dedicated parity system, the mapping function 220 would work much the same as in RAID 0 or 1 above, except that there would be one or more dedicated parity extent(s) 230 (which may be on a dedicated parity disk) that would not receive direct reads or writes—rather, they would receive the parity calculations 235 from the data across the other extents 215 *a-n*; the parity may be calculated at a stripe 225 *a-n* level or a block level (e.g., the first depth-level block in each non-parity extent in a given stripe is used to calculate parity blocks in the first depth-level block of the given strip in the parity disks, likewise with the second depth-level block in each non-parity extent, and so forth).

In embodiments utilizing distributed parity systems (not illustrated), the parity may still be calculated at a block or stripe 225 *a-n* level. In a stripe 225 *a-n* level parity system, for each stripe 225 *a-n* recorded, the mapping function selects N extents 215 *a-n* to serve as parity extents, and M extents to serve as data extents, and the data and parity are written accordingly. The choice of which extents 215 *a-n* to serve as parity extents changes algorithmically, such as via a round-robin approach. In a block level parity system, each depth-level of a stripe 215 *a-n* has N extents chosen as parity extents, and M extents chosen as data extents. Data is written one depth-level at a time, and the selection of parity and data extents rotate programmatically one depth-level at a time. As the selection of parity location is made algorithmically in both stripe 225 *a-n* and block level parity, the mapping function 220 may mathematically determine each data block's location.

In other example embodiments, the storage system 200 need not utilize a traditional RAID configuration. For example, the extents 215 *a-n* may simply be replicas of each other, or the data may be stored as key-values with parity.

In some embodiments, the drives providing extents 215 *a-n* need not be physically co-located; they could be spread across servers, chassis, and datacenter locations.

Figure 3A:
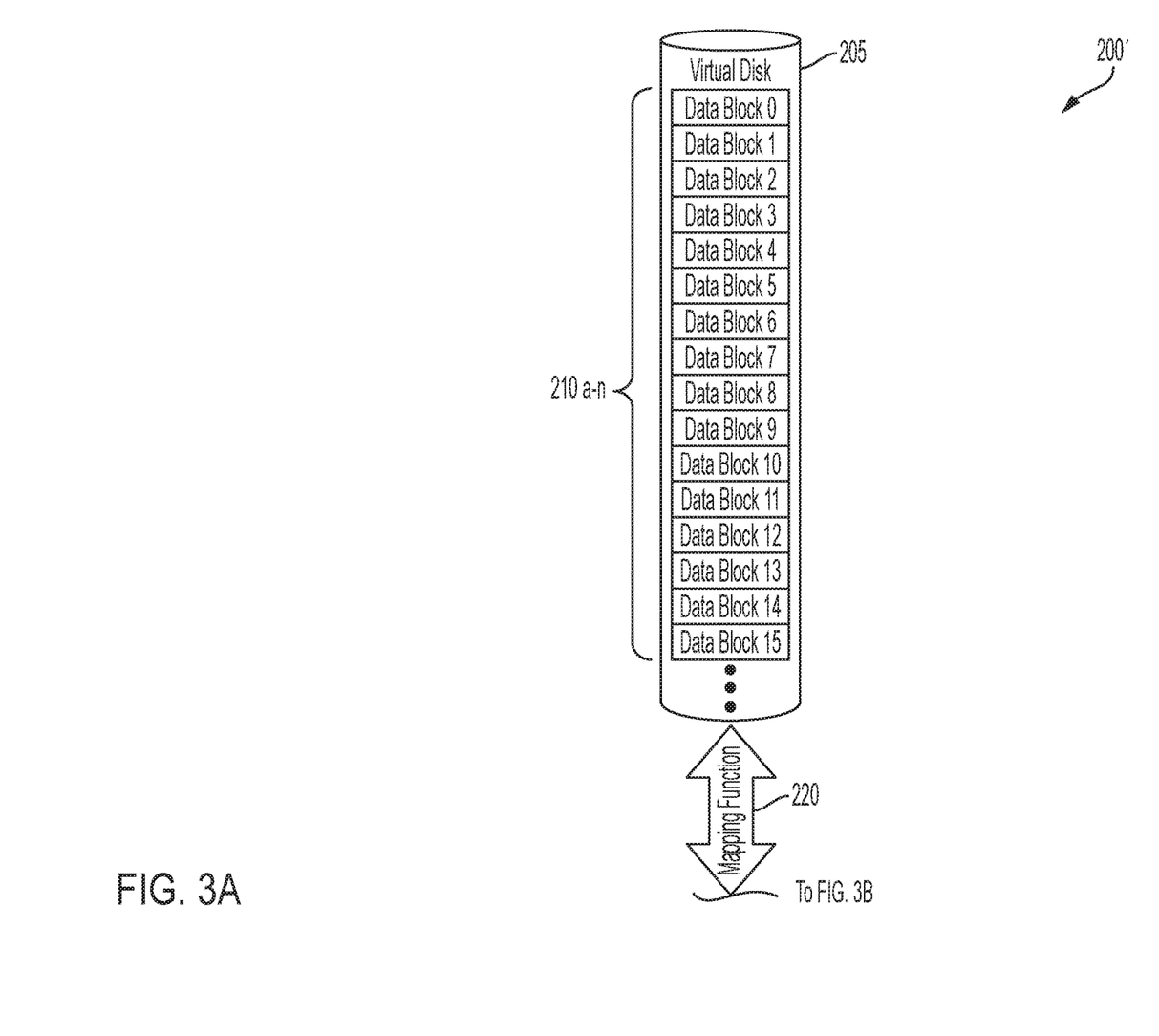
FIGS. 3A and 3B illustrate a schematic diagram of a storage system undergoing migration according to some example embodiments of the present disclosure.
Figure 3B:
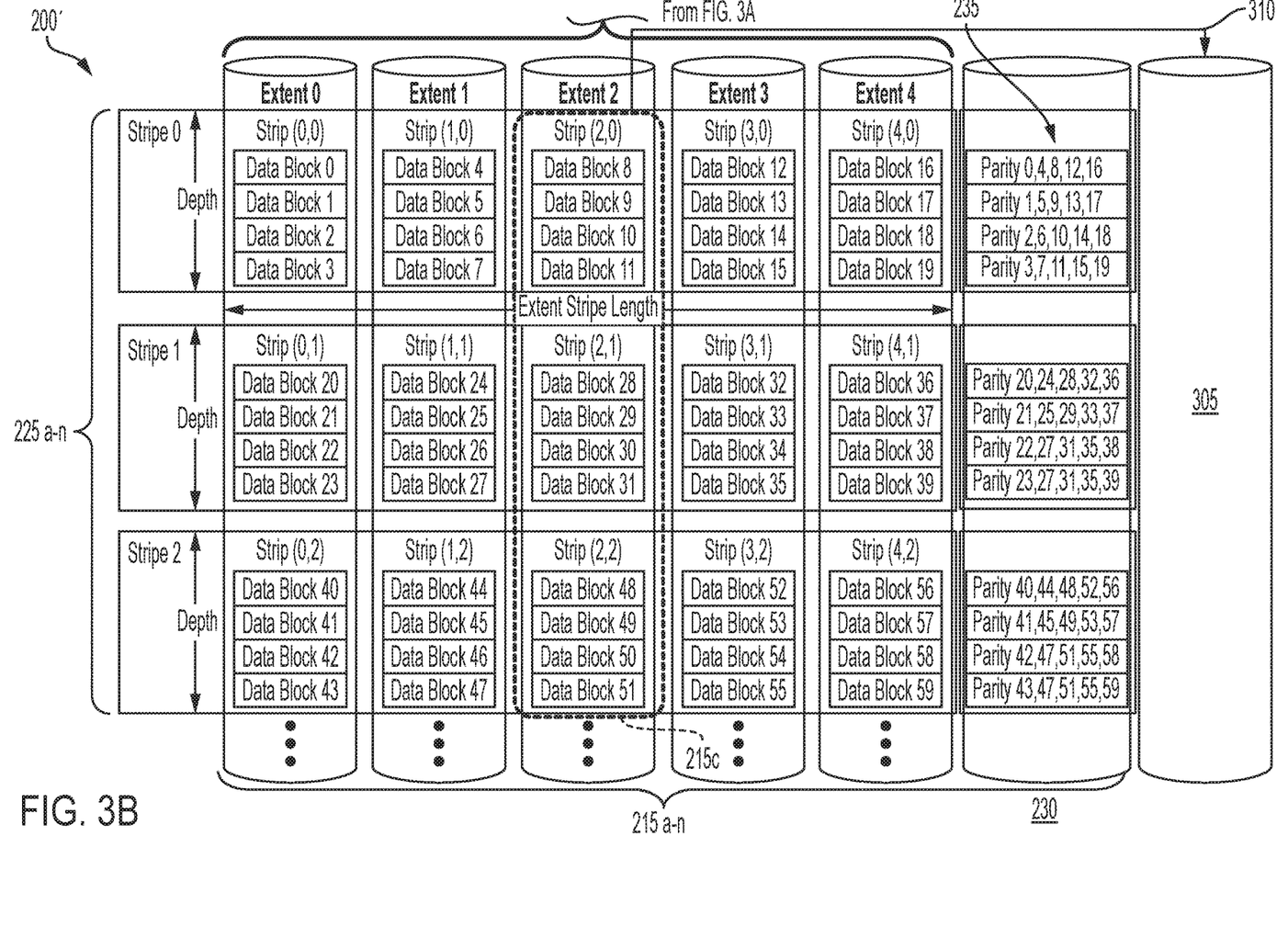

Turning to FIGS. 3A and 3B, an embodiment of an example storage system 200' is shown. Storage system 200' is largely similar to the system 200 of FIGS. 2A and 2B, and thus like parts are labeled with like numbers; however, the system 200' has detected that a physical drive housing extent 2 has entered read-only mode (drive/extent 215*c*, in this example, but it could be any of drives/extents 215 that ultimately enters read-only mode). In order for storage system 200' to continue operations, the data stored on extent 2 (drive 215*c*) must be transferred over to a replacement physical drive 305 via a process 310, which process will be described further below. The replacement physical drive 305 may be a part of the system 200', but until a drive 215*c* enters read-only mode, it is not considered as a drive for the storage or retrieval of information by mapping function 220.

The replacement physical drive 305 may be located anywhere. More specifically, in some examples, the replacement physical drive may be housed in a chassis with the physical drives of extents 215 *a-n*, in a server rack alongside other physical drives of extents 215 *a-n*, and/or attached to a network in communication with the other physical drives of extents 215 *a-n*. In some embodiments, the physical drives of extents 215 *a-n* are physically dispersed (e.g., in substantially different geographic locations). In such embodiments, the replacement physical drive 305 may be selected from a location that is as close as possible to the read-only extent 215*c* of the extents 215 *a-n* in order to gain bandwidth/latency benefits during data transfer.

The decision to convert a physical drive housing an extent into a read-only mode may be done by the specific individual physical drive, or by the storage system 200' as a whole. The decision may be made based on a variety of factors that may indicate that the specific physical drive is nearing its end of life. Such factors may include: reaching a raw bit error rate threshold on its storage media, reaching a threshold number of erase cycles on its storage media, or having the physical drive itself reach a threshold age, amongst others.

Figure 4:
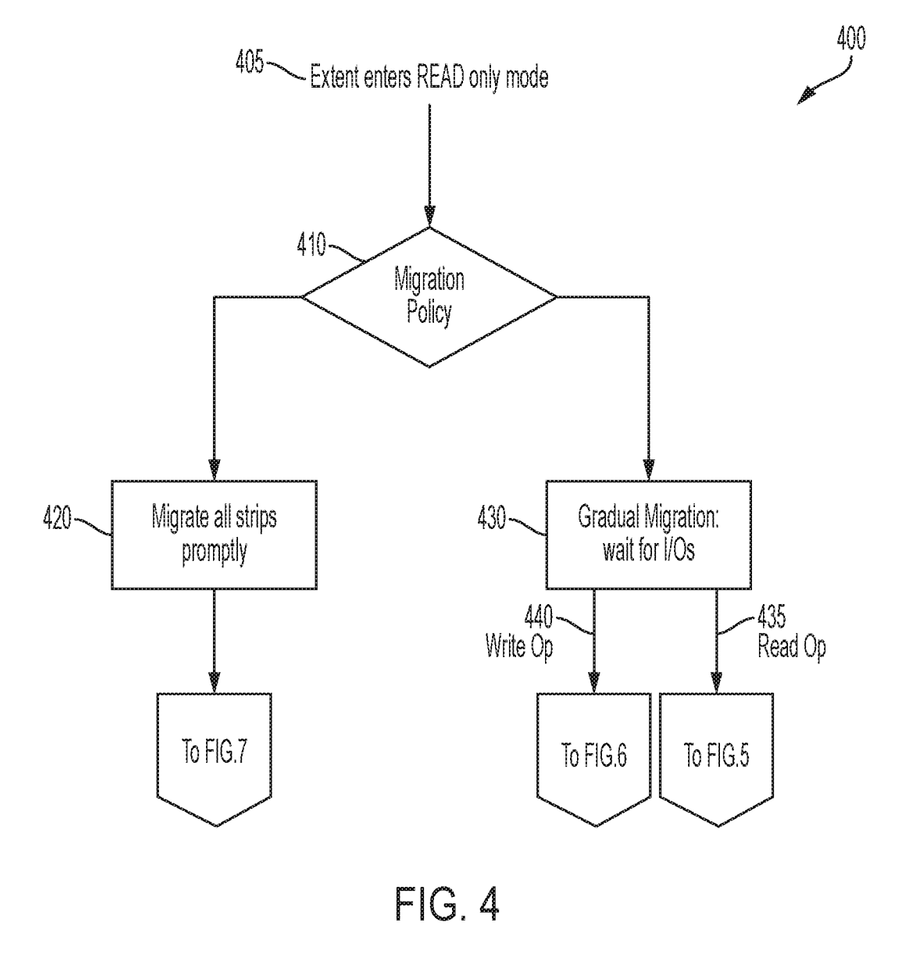
FIG. 4 is a flowchart for a method for determining a migration technique according to some example embodiments of the present disclosure.

Turning to FIG. 4, a method 400 is shown for determining if and how data should be migrated from a read-only extent 215*c* to a replacement physical disk 305 housing a replacement extent. At process 405, the system detects that a drive housing an extent has entered into a read-only mode (e.g., 215*c*). At process 410, a policy is consulted to determine whether the migration should be "prompt" 420 (i.e., move all data as soon as possible) or "gradual" 430 (as will be explained further below). The policy may be a set of rules and guidelines that may be stored on tangible computer-readable media that provide instructions or rules for which form of migration to use under a variety of circumstances; however, each circumstance need not provide for a binary distinction—that is, factors may be weighed against each other. Such circumstances and rules include, in some embodiments, the following non-limiting examples:

1) A comparison of the number of extents in read-only mode to the number of allowable extent failures before data loss (e.g., due to parity, mirroring, RAID configuration, etc.):
   a. Having the number of extents in read-only mode meet or exceed an allowable parity number would weigh towards a prompt migration.
   b. Having the number of write-capable extents in operation that meet or exceeds a mirroring threshold would weigh towards gradual migration.
   c. The larger the number of drives in read-only mode, the more the policy may weigh towards prompt migration.
2) A level of quality of reliability desired by a user of the system 200':
   a. Stronger guarantees of data reliability would weigh more towards prompt migration.
3) A level of throughput or bandwidth desired by a user of the system 200':
   a. Immediate transfers may require substantial internal bandwidth usage within the system 200', as large amounts of data would need to be moved internally—thus, if a high throughput is desired by an end-user, a more gradual migration may be used.
4) Known or predicted workloads/behavior patterns compared with present activity:

a. For example, taking into account the discussion for 3) above, if the system 200' handles periodically heavy workloads on a known schedule, the system may be weighted towards prompt data transfers in situations where it is expected that the workload would be light, and weighted towards gradual migrations when the workloads are expected to be heavy. The system may decide to switch from one policy to another as time passes through the expected workload schedule. For example, if the storage system 200' is intended to handle daily backups at midnight, and a drive (and associated extent) enters read-only mode at 11 PM, then the system 200' may decide to perform immediate migration up until midnight, then switch over to gradual migration during the heavy traffic expected at midnight, etc.

When, according to the policy, a decision is made to use prompt migration (operation 420), all data on the extent 215c may be transferred as soon as possible to the replacement physical disk 305. Some example embodiments of this migration are described with respect to FIG. 7.

When, according to policy, a decision is made to use gradual migration 430, the process may wait for I/Os to occur. The nature of the operations that take place depends on whether the received I/O is a read operation 435, or a write operation 440, some embodiments of which are described in FIGS. 5 and 6, respectively.

Figure 5:
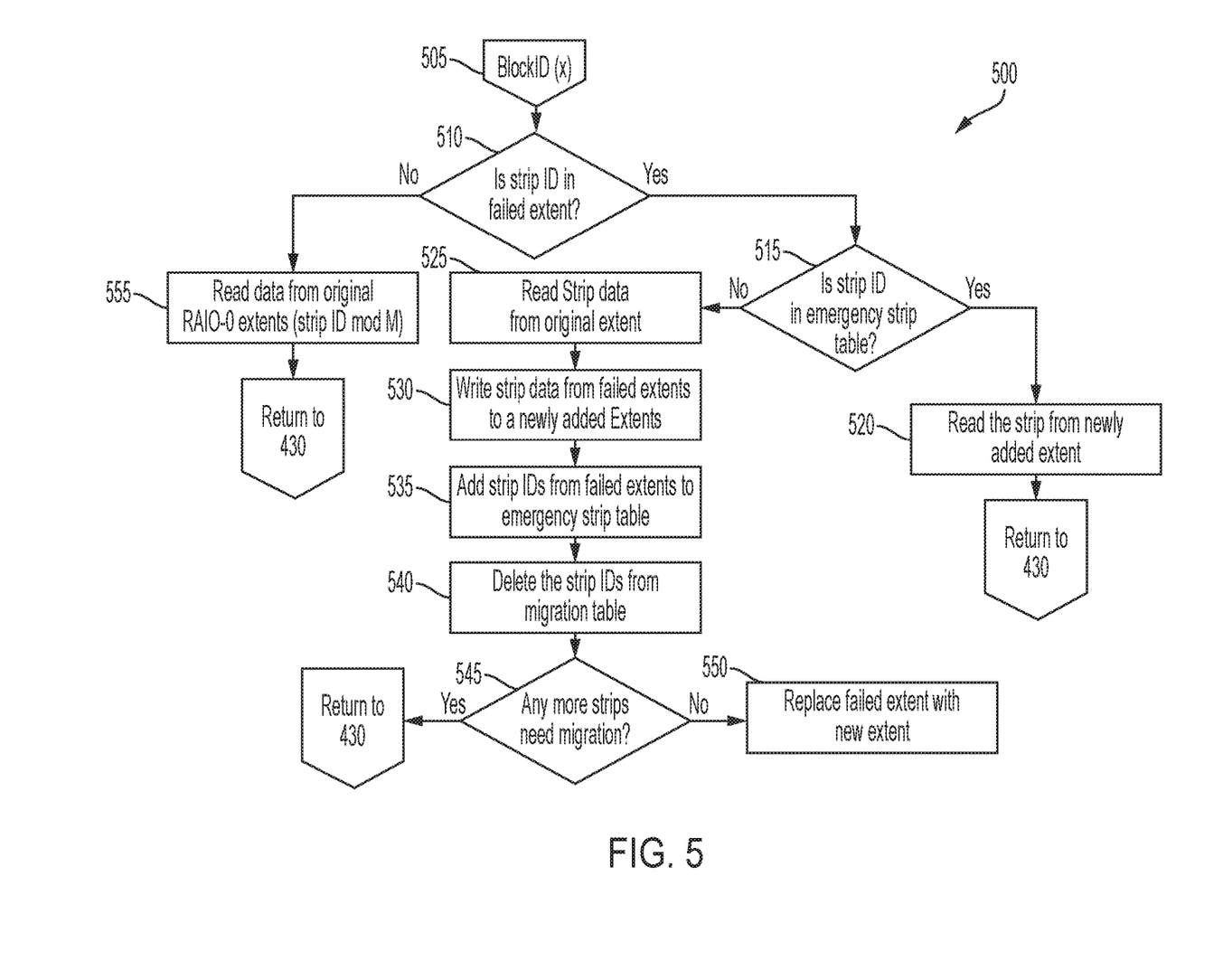
FIG. 5 is a flowchart for a method for handling migration of read requests, according to some example embodiments of the present disclosure.

Turning to FIG. 5, shown is an example method 500 for handling a read operation when the storage system 200' has decided that "gradual" migration may be used. At process 505, a read operation, including an identifier of the data sought (e.g., a block ID), may be received. At process 510, it may be determined whether or not the read request targets data on the read-only ("failed") extent 215c, or targets data on a fully operational extent. Such a determination may be made using the data's ID. When it is determined that the read request targets data on a fully operational extent, at process 555, the data may be read from the fully operational extent and returned. The process may then return to process 430 of FIG. 4 to await further I/Os. If it is determined at process 510 that the data may be located on the failed extent 215c, an emergency table may be consulted at process 515.

The emergency table of process 515 may be a table similar to one of the example embodiments shown below; it may track which strips of the failed extent 215c have been migrated to the replacement disk/extent 305. Note that, in other embodiments, the data may be tracked by BlockID/Block location triplet, or the tracking may be done in the negative (e.g., listing which data has not been migrated).

Example emergency Table 1: Table may track strips as they are migrated. Note that the lead digit records the extent, and the second digit records the strip ID. In the example below, the replacement extent is labeled as extent 5.

| Strip ID | New Location |
|---|---|
| (2, 0) | (5, 0) |
| (2, 2) | (5, 2) |
| ... (filled in as required) ... | ... (filled in as required) ... |

Example emergency Table 2: Table may track blocks as they are migrated. Note that, as discussed above, the location of a specific block may be expressed (at this logical level) as a triplet of (Extent, Strip, Depth-level). This table may be filled in as data is migrated.

| Block Location | New Location |
|---|---|
| (2, 0, 1) | (5, 0, 1) |
| (2, 2, 0) | (5, 2, 0) |
| ... (filled in as required) ... | ... (filled in as required) ... |

Example emergency Table 3: This table lists all strips (or blocks) on the read-only extent 215c, and a bit is set based on whether or not the strip (or block) has been migrated to the new extent. Note that the new address of the data is implicit in the table, since it is known to be migrated to a corresponding location on replacement extent 5. A similar table may be drawn up to track blocks, as in Table 2 above.

| Strip ID | Migrated to Extent 5? |
|---|---|
| (2, 0) | 1 |
| (2, 1) | 0 |
| (2, 2) | 0 |
| (2, 3) | 1 |
| ... | ... |

Returning to FIG. 5, at process 515, an emergency table may be consulted to determine if the data requested has been migrated to the replacement extent. Such a determination may be made using the data's ID. Based on determining that the requested data has been migrated, at process 520, the data may be read from the location indicated on the replacement extent 305, and the data may be returned to the host. In some embodiments, the data may also be read from the read-only extent 215c, if it is still in operation. The process may then return to process 430 of FIG. 4 and await further I/Os.

Based on determining that the data has not yet been migrated, at process 525, the requested data may be read from the read-only extent 215c, and returned to the host. At process 530, the data may also be copied/migrated to a corresponding location on the replacement extent in the replacement disk 305. At process 535, the ID of the data copied, and its new location, may be added to the emergency table in a manner that indicates that it has been migrated. At process 540, the IDs of the data that have been migrated may be removed from a migration table, or the migration table is otherwise updated to indicate that the data has been migrated. Process 540 may be optional.

In some embodiments, a data migration table may be similar to the emergency table, but work in reverse. More specifically, in some embodiments, while the emergency table tracks all data that has been migrated, and where it has been migrated to, the migration table tracks all of the data that has yet to be migrated. The tables may actually be merged as one table; example Table 3 serves such a purpose. The migration table and the emergency table may be stored in the storage system 200'. In some embodiments, a copy of the migration table and/or emergency table may be stored on multiple extents 215 *a-n*

At process 545, it is determined if there is any more data that requires migration. This may be accomplished by referring to the migration and/or emergency tables. When all data has been migrated, at process 550, the read-only extent 215c may be retired, and the replacement disk and extent 305 may fully replace it in the system. This may be determined by checking the migration table, or by comparing the contents of the emergency table to a list of the contents of the read-only extent. If more data still requires migration, the process may return to process 430 of FIG. 4.

Note that, for processes 525-540, the migration system may work on data units of various sizes. For example, if a data block within strip 1 of read-only extent 215c is read, some embodiments of the system may track and copy the entirety of strip 1 over to the replacement extent 305 (even though only a block was requested); this may use, for example, emergency and migration tables similar to Table 1. Other embodiments may choose to only track and copy the requested block; this may use emergency and migration tables similar to Table 2.

Figure 6:
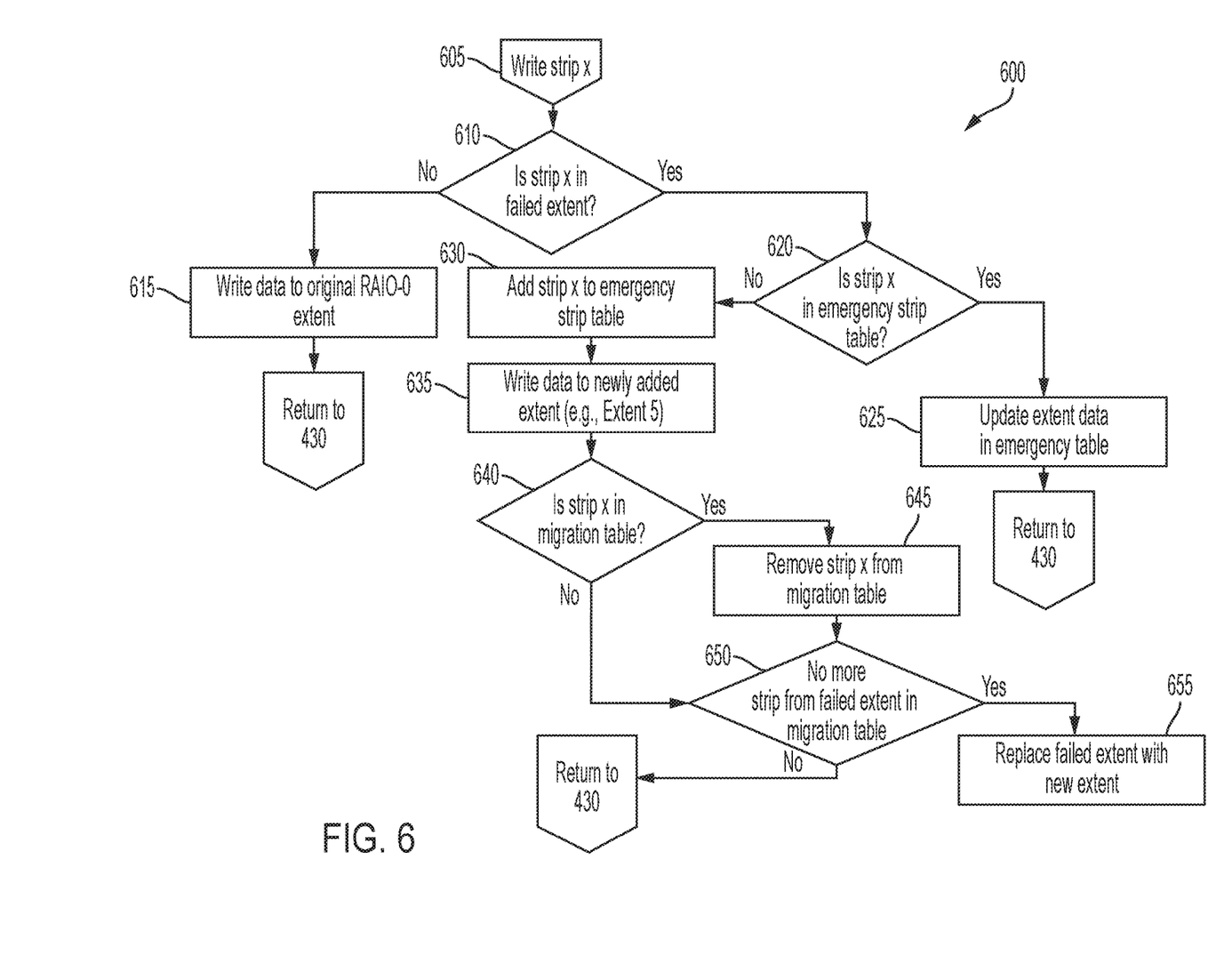
FIG. 6 is a flowchart for a method for handling migration of write requests, according to some example embodiments of the present disclosure.

Turning to FIG. 6, an example embodiment of a method 600 for responding to write requests in a storage system 200' utilizing gradual migration is shown. At process 605, a data write request, including an ID (e.g., a block ID), may be received. At process 610, a determination may be made as to whether the data would be written to a read-only (failed) extent, or to a fully operational extent. Such a determination may be made using the data's ID. Based on determining that the data is to be written to a fully operational extent, at process 615, the data may be written to the fully operational extent. The process may then return to process 430 of FIG. 4.

Based on determining that the data would be written to a read-only extent 215c, the process 620 then determines if the data has already been migrated, for example, by utilizing the emergency table and/or migration table. Such a determination may be made using the data's ID. Based on determining that the data has already been migrated to the replacement extent 305, at process 625, the data is written directly to the replacement extent 305. The process may then return to process 430 of FIG. 4. Based on determining that the data is not in the emergency table/migration table, at process 630, the data may be added to the emergency table. At process 635, the data may be written to the replacement extent 305. At process 640, a determination is made as to whether the data is found in the migration table. At process 645, based on determining that the data is in the migration table, the data may be removed (or otherwise marked as migrated) from the migration table.

Based on determining that the data is not in the migration table, or after removing the data from the migration table, a determination is made at process 650 as to whether no more data remains to be migrated from the read-only extent 215c. This may be determined by checking the migration table, or by comparing the contents of the emergency table to a list of the contents of the read-only extent. Based on determining that there is no more data to be migrated, at process 655, the read-only (failed) extent 215c may be fully replaced (and may be retired) within the storage system 200' by extent 305. Based on determining that data remains to be migrated, the process may return to process 430 of FIG. 4.

Similar to the process discussed with regard to FIG. 5, the process of FIG. 6 may operate using various units of data size. For example, if a data block within strip 1 of read-only extent 215c is written, some embodiments of the system may track and copy the entirety of strip 1 over to the replacement extent 305 (even though only a block was requested); this may use, for example, emergency and migration tables similar to Table 1. Other embodiments may choose to track and copy only the requested block; this may use emergency and migration tables similar to Table 2.

Figure 7:
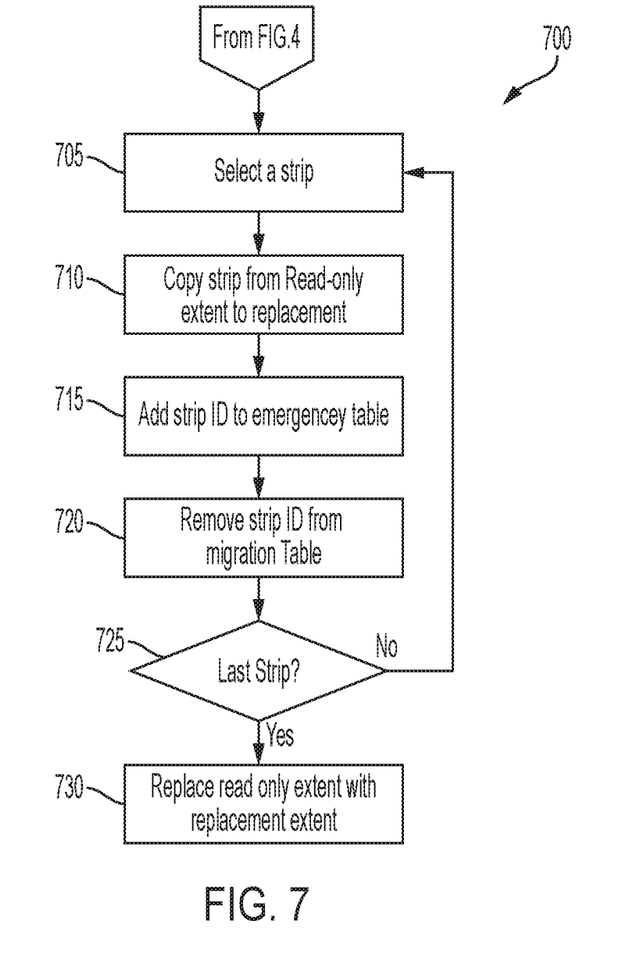
FIG. 7 is a flowchart for a method for prompt migration, according to some example embodiments of the present disclosure.

Turning to FIG. 7, shown is a method 700 for prompt migration of data from a read-only extent 215c to a replacement extent/disk 305. When a determination is made to use prompt migration at process 420 of FIG. 4, the process of FIG. 7 may be used. To achieve prompt data migration, the performance of the method of FIG. 7 may be given a high priority relative other tasks of the system 200', such that data is migrated as rapidly as reasonably possible, while maintaining system usability. At process 705, a strip may be selected for migration. The selection process may be through a variety of means, such as in numerical order. At process 710, the strip may be copied from the read-only extent 215c to the replacement extent 305. At process 715, the strip (via its ID) may be added to the emergency table. At process 720, the strip may be removed (or marked as migrated) from the migration table. At process 725, a determination is made as to whether the strip migrated was the last strip requiring migration on the read-only extent. Based on determining that more strips require migration, the process may return to 705. Based on determining that no more strips require migration, process 730 may replace the read-only extent 215c with the replacement extent 305, and retire extent 215c. This may be determined by checking the migration table, or by comparing the contents of the emergency table to a list of the contents of the read-only extent. Note that, although this process discusses copying strips, as with the processes described above with regard to FIGS. 5-6, alternate embodiments may choose to track and migrate data at a block level.

Note that, in some embodiments, the mapping of extents to drives may be many-to-one. That is, an extent may be a logical subdivision (logical drive) housed within a physical drive, alongside other extents. Thus, an extent selected for migration (e.g. extent 215c) may be considered as a logical drive (that is, a logical subdivision of a physical drive). Likewise, the migration destination extent (the new extent/drive 305) may also be a logical drive (that is, a subdivision of a physical drive). Note also that when a physical drive enters read-only-mode, this may therefore cause multiple extents to enter read-only mode. This should not change the underlying operational concepts expressed herein; it would simply require migrating more extents, using correspondingly larger (or more numerous) emergency and migration tables.

In some embodiments, the processes of FIGS. 4-7 may be adapted for storage systems 200' using parity. For example, whenever data is written to a block, the parity for that block is also updated with a write. Therefore, if the parity for a particular set of blocks is on a read-only extent 215c, any update to one of the set of blocks on the fully-operational extents may also cause a write in the read-only extent 215c, and trigger the process of FIG. 6. As another example, if a read occurs for data on a fully operational extent, the system may choose to treat that as also a read for the parity data, in order to trigger the process of FIG. 5 (this may be because parity data is rarely read—so that such a mechanism would "speed up" the migration of parity data through reads).

In some embodiments, the processes of FIGS. 4-7 may be adapted to use storage systems not using block-based storage. For example, each strip may comprise a portion of, or one or more values of, a key-value store. The key would serve as a data ID, and the data may be located through a look-up table. Thus, for example, any read or write on a value of a key-value stored at least partially on a strip located on a read-only extent would trigger the operation of FIGS. 5-6.

Methods disclosed herein proposed various component processes which may be removed or re-ordered and still remain within the inventive scope of the present disclosure, as would be understood by a skilled person of the art having read the disclosure.

Method processes may be stored on tangible, computer-readable media, and performed by one or more programmable processors executing a computer program to perform functions by operating on input data and generating output. Method processes also may be performed by, and an apparatus may be implemented as, special-purpose logic circuitry, e.g., an FPGA (field programmable gate array) or an ASIC (application-specific integrated circuit).

In various embodiments, a computer-readable medium may comprise instructions that, when executed, cause a device to perform at least a portion of the method processes. In some embodiments, the computer-readable medium may be comprised in a magnetic medium, optical medium, other medium, or a combination thereof (e.g., CD-ROM, hard drive, a read-only memory, a flash drive). In such an embodiment, the computer-readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts is to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

Method processes may be performed by one or more programmable processors executing a computer program to perform functions by operating on input data and generating output. Method processes also may be performed by, and an apparatus may be implemented as, special-purpose logic circuitry, e.g., an FPGA (field programmable gate array) or an ASIC (application-specific integrated circuit).

In various embodiments, a computer-readable medium may comprise instructions that, when executed, cause a device to perform at least a portion of the method processes. In some embodiments, the computer-readable medium may be comprised in a magnetic medium, optical medium, other medium, or a combination thereof (e.g., CD-ROM, hard drive, a read-only memory, a flash drive). In such an embodiment, the computer-readable medium may be a tangibly and non-transitorily embodied article of manufacture.

Embodiments of the inventive concept may extend to the following statements, without limitation:

1) A method for migrating data in a storage system comprising a plurality of active extents and one or more replacement logical or physical drives, the method comprising:
  determining that an active extent of a storage system has entered read-only mode,
  determining, based on a storage policy, whether the storage system should promptly migrate data or gradually migrate data,
  based on determining that the storage system should promptly migrate data, copying data from the read-only extent to a replacement logical or physical drive as soon as possible; and
  based on determining that the storage system should gradually migrate data, upon receiving a read request for a data unit in the extent, copying the data unit from the read-only drive to the replacement logical or physical drive, and upon receiving a write request for a data unit in the read-only extent, writing the data unit to the replacement logical or physical drive.

2) The method of statement 1, wherein, upon receiving a read request for a data unit, the entire strip within the read-only extent containing the data unit is copied to the replacement logical or physical drive.

3) The method of statement 1, wherein, when a data unit is copied from the read-only extent to the replacement logical or physical drive as a result of a read operation, or when a data unit is written to the replacement logical or physical drive as a result of a write operation to the read-only extent, the data unit is recorded in an emergency table as having been migrated to the replacement logical or physical drive.

4) The method of statement 3, additionally comprising redirecting a subsequent read or write to a data unit found on the emergency table to the replacement logical or physical drive.

5) The method of statement 4, additionally comprising, based on determining that all data units in the read-only extent have been migrated to the replacement logical or physical drive, replacing the read-only extent with the replacement logical or physical drive as an active extent.

6) The method of statement 5, wherein the determining that all data units in the read-only extent have been migrated comprises comparing the list of migrated data units on the emergency table with a list of data units in the read-only extent, or consulting a migration table, or in determining that a migration table indicates that all data units have been migrated.

7) The method of statement 1, wherein the read-only extent entered read-only mode due to having reached a threshold level of wear.

8) The method of statement 7, wherein the threshold level of wear is determined by one or more of: a raw-media error rate, a number of erase cycles for a portion of the storage media, and a product lifespan threshold being exceeded.

9) The method of statement 1, wherein the storage policy comprises one or more of: a minimum throughput requirement, a minimum bandwidth requirement, a persistency requirement, a RAID level requirement, and a parity level requirement.

10) A non-transitory computer-readable medium, having thereon instructions that cause a processor in a computer storage system comprising a plurality of active extents and one or more replacement logical or physical drives, to perform the following:
  determining that an active extent of a storage system has entered read-only mode,
  determining, based on a storage policy, whether the storage system should promptly migrate data or gradually migrate data,
  based on determining that the storage system should promptly migrate data, copying data from the read-only extent to a replacement logical or physical drive as soon as possible; and
  based on determining that the storage system should gradually migrate data, upon receiving a read request for a data unit in the extent, copying the data unit from the read-only drive to the replacement logical or physical drive, and upon receiving a write request for a data unit in the read-only extent, writing the data unit to the replacement logical or physical drive.

11) The non-transitory computer-readable medium of statement 10, wherein, upon receiving a read request for a data unit, the entire strip within the read-only extent containing the data unit is copied to the replacement logical or physical drive.

12) The non-transitory computer-readable medium of statement 10, wherein, when a data unit is copied from the read-only extent to the replacement logical or physical drive as a result of a read operation, or when a data unit is written to the replacement logical or physical drive as a result of a write operation to the read-only extent, the data unit is recorded in an emergency table as having been migrated to the replacement logical or physical drive.

13) The non-transitory computer-readable medium of statement 12, additionally comprising redirecting a subsequent read or write to a data unit found on the emergency table to the replacement logical or physical drive.

14) The non-transitory computer-readable medium of statement 13, additionally comprising, based on determining that all data units in the read-only extent have been migrated to the replacement logical or physical drive, replacing the read-only extent with the replacement logical or physical drive as an active extent, or consulting a migration table.

15) The non-transitory computer-readable medium of statement 14, wherein the determining that all data units in the read-only extent have been migrated comprises comparing the list of migrated data units on the emergency table with a list of data units in the read-only extent, or in determining that a migration table indicates that all data units have been migrated.

16) The non-transitory computer-readable medium of statement 10, wherein the read-only extent entered read-only mode due to having reached a threshold level of wear.

17) The non-transitory computer-readable medium of statement 16, wherein the threshold level of wear is determined by one or more of: a raw-media error rate, a number of erase cycles for a portion of the storage media, and a product lifespan threshold being exceeded.

18) The non-transitory computer-readable medium of statement 10, wherein the storage policy comprises one or more of: a minimum throughput requirement, a minimum bandwidth requirement, a persistency requirement, a RAID level requirement, and a parity level requirement.

19) A storage system comprising:
a plurality of active extents;
one or more replacement drives;
a processor; and
a memory coupled to the processor, wherein the memory stores instructions that, when executed by the processor, cause the processor to:
determine that an active extent of a storage system has entered read-only mode to become a read-only extent;
determine, based on a storage policy, whether or not the storage system should promptly migrate data or gradually migrate data;
based on determining that the storage system should promptly migrate data, copy data from the read-only extent to a replacement logical or physical drive as rapidly as possible;
based on determining that the storage system should gradually migrate data, upon receiving a read request for a data unit in the extent, copy the data unit from the read-only drive to the replacement logical or physical drive; and upon receiving a write request for a data unit in the read-only extent, write the data unit to the replacement logical or physical drive.

What is claimed is:
1. A method for migrating data in a storage system comprising active extents and one or more replacement logical or physical drives, the method comprising:
determining that an active extent of a storage system has entered read-only mode to convert to a read-only extent;
determining, based on a storage policy, migration of data by the storage system according to a first migration policy or a second migration policy, wherein for the second migration policy, one or more data units is migrated based on a read or write request;
based on determining migration of the data by the storage system according to the first migration policy, copying the data from the read-only extent to a replacement logical or physical drive; and
based on determining migration of the data by the storage system according to the second migration policy based on receiving a read request for a data unit in the read-only extent, copying the data unit to the replacement logical or physical drive, and based on receiving a write request for a data unit in the read-only extent, writing the data unit to the replacement logical or physical drive.

2. The method of claim 1, further comprising copying a strip within the read-only extent containing the data unit to the replacement logical or physical drive based on a read request for a data unit.

3. The method of claim 1, wherein, based on a data unit being copied from the read-only extent to the replacement logical or physical drive as a result of a read operation, or based on a data unit being written to the replacement logical or physical drive as a result of a write operation to the read-only extent, the data unit is recorded in an emergency table as migrated to the replacement logical or physical drive.

4. The method of claim 3, additionally comprising redirecting another read or write to a data unit found on the emergency table to the replacement logical or physical drive.

5. The method of claim 4, additionally comprising, based on determining that data units in the read-only extent are migrated to the replacement logical or physical drive, replacing the read-only extent with the replacement logical or physical drive as an active extent.

6. The method of claim 5, wherein the determining that the data units in the read-only extent are migrated comprises comparing a list of migrated data units on the emergency table with a list of data units in the read-only extent, or in determining that a migration table indicates that the data units are migrated.

7. The method of claim 1, wherein the active extent enters the read-only mode to convert to the read-only extent based on a threshold level of wear.

8. The method of claim 7, wherein the threshold level of wear is determined by one or more of: a raw-media error rate, a number of erase cycles for a portion of a storage media, and a product lifespan threshold being exceeded.

9. The method of claim 1, wherein the storage policy comprises one or more of: a minimum throughput requirement, a minimum bandwidth requirement, a persistency requirement, a RAID level requirement, and a parity level requirement.

10. A non-transitory computer-readable medium, having thereon instructions that cause a processor in a computer storage system comprising active extents and one or more replacement logical or physical drives, to perform the following:
determining that an active extent of a storage system has entered read-only mode to convert to a read-only extent;

determining, based on a storage policy, migration of data by the storage system according to a first migration policy or a second migration policy, wherein for the second migration policy, one or more data units is migrated based on a read or write request;

based on determining migration of the data by the storage system according to the first migration policy, copying the data from the read-only extent to a replacement logical or physical drive; and based on determining migration of the data by the storage system according to the second migration policy based on receiving a read request for a data unit in the read-only extent, copying the data unit to the replacement logical or physical drive, and based on receiving a write request for a data unit in the read-only extent, writing the data unit to the replacement logical or physical drive.

11. The non-transitory computer-readable medium of claim 10, wherein the instructions further cause the processor to copy a strip within the read-only extent containing the data unit to the replacement logical or physical drive.

12. The non-transitory computer-readable medium of claim 10, wherein, based on a data unit being copied from the read-only extent to the replacement logical or physical drive as a result of a read operation, or based on a data unit being written to the replacement logical or physical drive as a result of a write operation to the read-only extent, the data unit is recorded in an emergency table as migrated to the replacement logical or physical drive.

13. The non-transitory computer-readable medium of claim 12, additionally comprising redirecting another read or write to a data unit found on the emergency table to the replacement logical or physical drive.

14. The non-transitory computer-readable medium of claim 13, additionally comprising, based on determining that data units in the read-only extent are migrated to the replacement logical or physical drive, replacing the read-only extent with the replacement logical or physical drive as an active extent.

15. The non-transitory computer-readable medium of claim 14, wherein the determining that the data units in the read-only extent are migrated comprises comparing a list of migrated data units on the emergency table with a list of data units in the read-only extent, or in determining that a migration table indicates that the data units are migrated.

16. The non-transitory computer-readable medium of claim 10, wherein the active extent enters the read-only mode to convert to the read-only extent based on a threshold level of wear.

17. The non-transitory computer-readable medium of claim 16, wherein the threshold level of wear is determined by one or more of: a raw-media error rate, a number of erase cycles for a portion of a storage media, and a product lifespan threshold being exceeded.

18. The non-transitory computer-readable medium of claim 10, wherein the storage policy comprises one or more of: a minimum throughput requirement, a minimum bandwidth requirement, a persistency requirement, a RAID level requirement, and a parity level requirement.

19. A storage system comprising:
active extents;
one or more replacement drives;
a processor; and
a memory coupled to the processor, wherein the memory stores instructions that, when executed by the processor, cause the processor to:
  determine that an active extent of a storage system has entered read-only mode to convert to a read-only extent;
  determine, based on a storage policy, migration of data by the storage system according to a first migration policy or a second migration policy, wherein for the second migration policy, one or more data units is migrated based on a read or write request;
based on determining migration of the data by the storage system according to the first migration policy copy the data from the read-only extent to a replacement logical or physical drive;
based on determining migration of the data by the storage system according to the second migration policy based on receiving a read request for a data unit in the read-only extent, copy the data unit to the replacement logical or physical drive; and
based on receiving a write request for a data unit in the read-only extent, write the data unit to the replacement logical or physical drive.

* * * * *